(12) United States Patent
Takushima et al.

(10) Patent No.: US 6,983,089 B2
(45) Date of Patent: Jan. 3, 2006

(54) METHOD OF FABRICATING OPTICAL SIGNAL PROCESSOR

(75) Inventors: Michiko Takushima, Yokohama (JP); Tomomi Sano, Yokohama (JP); Osamu Shimakawa, Yokohama (JP); Tatsuhiko Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/987,293

(22) Filed: Nov. 15, 2004

(65) Prior Publication Data

US 2005/0141807 A1    Jun. 30, 2005

Related U.S. Application Data

(60) Provisional application No. 60/523,662, filed on Nov. 21, 2003.

(30) Foreign Application Priority Data

Nov. 20, 2003    (JP) .......................... P2003-390416

(51) Int. Cl.
*G02B 6/28*    (2006.01)
(52) U.S. Cl. .......................... 385/24; 385/15
(58) Field of Classification Search .................. 385/15, 385/24
See application file for complete search history.

(56) References Cited

U.S. PATENT DOCUMENTS 5,936,752 A * 8/1999 Bishop et al. ................. 398/90
5,960,133 A * 9/1999 Tomlinson .................... 385/18

OTHER PUBLICATIONS

Marom, D.M., et al. "Wavelength-selective 1x4 switch for 128 WDM channels at 50 GHz spacing." OFC2002 Post-deadline Papers, FB7-1-FB7-3 (2002).

* cited by examiner

*Primary Examiner*—Jennifer Doan
(74) *Attorney, Agent, or Firm*—McDermott Will & Emery LLP

(57) ABSTRACT

An optical signal processor, capable of eliminating design change of lens optical systems, it is fabricating by selecting one or more optical waveguides, each having a mode field diameter such that a desired band width of the transmission characteristics of the whole optical signal processor with respect to the light beam are selected as the input and output optical waveguides. When one optical waveguide is selected, the selected optical waveguide is applied as a common optical waveguide corresponding to both input and output optical waveguides. When two optical waveguides are selected, one is applied to the input optical waveguide and the other is applied to the output optical waveguide.

12 Claims, 6 Drawing Sheets

METHOD OF FABRICATING OPTICAL SIGNAL PROCESSOR

CROSS-REFERENCE TO RELATED APPLICATION

This application claims priority to Provisional Application Ser. No. 60/523,662 filed on Nov. 21, 2003, which is hereby incorporated by reference in its entirety.

BACKGROUND OF THE INVENTION

1. Field of the Invention

The present invention relates to a method of fabricating an optical signal processor in which a light beam emitted from the end surface of an input optical waveguide is wavelength-divided and processed, to thus be incident on the end surface of an output optical waveguide.

2. Related Background Art

In general, a large number of optical signal processors used in an optical communication field enters a light beam emitted from the end surface of an optical fiber, give some process to the inputted light beam, and apply the resultant light beam to the end surface of anther optical fiber. In particular, an optical signal processor used in wavelength division multiplexing (WDM) optical communications can give a process to signal components having wavelengths different from each other by a diffraction grating element for spatially wavelength-dividing the inputted light beam.

For example, an optical signal processor described in the document 1 (D. M. Marom, et al., "Wavelength-selective 1×4 switch for 128 WDM channels at 50 GHz spacing", OFC2002 Postdeadline Papers, FB7 (2002)), is used as an optical multiplexing/demultiplexing component in WDM optical communication systems. In this optical signal processor, the light beam emitted from the end surface of an optical fiber is inputted and collimated through an optical lens system, the collimated light beam is diffracted into a plurality of signal components having wavelengths different from each other at an angle of diffraction according to a wavelength through a diffraction grating element, and the diffracted signal components are condensed at the optical lens system to thus be reflected by the associated mirror reflectors. Further, the reflected signal components are multiplexed through the diffraction grating element, and the multiplexed light beam is inputted to the end surface of another optical fiber. Then, an input/output end of the signal component having each wavelength can be selected by adjusting the inclination of the associated mirror reflector provided according to each wavelength.

SUMMARY OF THE INVENTION

The inventors have studied conventional optical signal processors in detail, and as a result, have found problems as follows. Namely, when light is strength-modulated to generate a signal light including a plurality of signal components, there are some cases that a wavelength of each signal component varies. Accordingly, it is desired that an optical filter and so on employed on an optical transmission line has a wide band range to exhibit expected characteristics even when the wavelength of each signal component varies. Meanwhile, in WDM optical communications, when the signal components having adjoining wavelengths cannot be separated perfectly, there occurs crosstalk to deteriorate transmission quality. Accordingly, it is necessary that the band width of optical filters and so on is set on the optimum condition for each optical transmission line to be employed. Therefore, in the case of the aforementioned optical signal processor, it is necessary that the band width of the signal components having wavelengths different from each other that are wavelength-divided by the diffraction grating element is set according to the characteristics of the optical transmission lines to be employed.

In the optical signal processor described in the above-mentioned document 1, the diameter of light beam at a mirror reflector is determined according to a focal length of each lens optical system, and thereby a band width of the transmission characteristics of the whole optical signal processor with respect to the light beam reaching from an input optical fiber to an output optical fiber is determined. Therefore, in order to change the band width of the transmission characteristics of the whole optical signal processor, it is necessary to change the focal length of each lens optical system; thereby, there occurs the necessity to redesign the whole optical system for each optical transmission line to be employed once again.

The present invention is achieved to solve the above problems, and it is an object to provide a method of fabricating an optical signal processor capable of eliminating design change for lens optical systems and so on, and easily changing the band width of the transmission characteristics of the optical signal processor.

The present invention relates to a method of fabricating an optical signal processor. This optical signal processor includes: a spatial wavelength-dividing element, a spatial optical modular, a first lens system, and a second lens system. The spatial wavelength-dividing element spatially wavelength-divides a light beam into a plurality of beam components having wavelengths different from each other, and is provided on an optical path reaching from an input optical waveguide to an output optical waveguide. The spatial optical modulator spatially modulates the beam components wavelength-divided by the spatial optical modulator. The first lens system introduces the light beam outputted from the end surface of the input waveguide to the spatial wavelength dividing element as a collimated light. The second lens system introduces the beam components wavelength-divided by the spatial wavelength-dividing element to the spatial optical modulator while condensing the beam components. Here, the wording "modulate spatially a light beam" means that changes for the intensity, phase, propagating direction and the like are applied to a spatially-propagating light beam corresponding to the position.

In particular, the method of fabricating an optical signal processor according to the present invention is characterized by: selecting one or more optical waveguides each having a mode field diameter such that a desired band width of the transmission characteristics of the whole optical signal processor with respect to the light beam reaching from the input waveguide to the output waveguide can be obtained; fabricating the optical signal processor by applying the selected optical waveguide as a common optical waveguide corresponding to both of the input optical waveguide and the output optical waveguide, when one optical waveguide is selected; and fabricating the optical signal processor by applying one of the selected optical waveguides to the input optical waveguide and applying another of the selected optical waveguides to the output optical waveguide, when plural optical waveguides are selected.

As described above, in accordance with the present invention, when the input optical waveguide and the output optical waveguide having a set mode field diameter are selected, the optical signal processor is fabricated, whereby the band width of the transmission characteristics of the whole optical signal processor can be set to a desired quantity. The design change of the lens optical system and the like can be eliminated, and the band width of the transmission characteristics of the whole optical signal processor can be easily changed on design. Note that the input optical waveguide and the output optical waveguide may be separated or common. In addition, the input optical waveguide and the output optical waveguide each may be single or plural. When the input optical waveguide and the output optical waveguide are different from each other, it is required that the output optical waveguide have such a structure and optical characteristics as enable to transmit sufficiently the light beam passing through the first lens optical system to be emitted.

Here, it is preferable that the spatial wavelength-dividing element includes a diffraction grating element. It is preferable that the spatial optical modulator includes a mirror reflector. In addition, it is preferable that the mirror reflector has an inclinable or bendable reflective surface.

In the method of fabricating an optical signal processor according to the present invention, the first lens optical system preferably receives the light beam emitted from the end surface of the input optical waveguide with a numerical aperture of 0.12 or more (more preferredly, a numerical aperture of 0.3 or more). In addition, it is further preferable that the first lens optical system receives the light beam emitted from the end surface of the input optical waveguide with a numerical aperture of 0.4 or more. In ngeneral, when the mode field diameter of the optical waveguide is different, the numerical aperture of the optical waveguide with respect to the light beam is also different. That is, when the first lens optical system capable of receiving the light beam emitted from the end surface of the input optical waveguide is employed in conformity of the numerical aperture of the optical waveguide, the optical signal processor having a small insertion loss can be obtained.

In the method of fabricating an optical signal processor according to the present invention, it is preferable that the selected one or more optical waveguides as the input waveguide and the output waveguide satisfy the following relationship:

$$(f2/f1)\omega/\Delta L \leq (\lambda\omega - \Delta\lambda)/\lambda\omega$$

where f1 is the focal length of the first lens system, f2 is the focal length of the second lens system, $\lambda\omega$ is the wavelength range of the light beam whose principal ray reaches from the spatial wavelength-dividing element to the reflective surface of one mirror reflector as the spatial optical modulator, $\Delta L$ is the width of the reflective surface along the wavelength-dividing direction according to the spatial wavelength-dividing element, $\Delta\lambda$ is the band width of the transmission characteristics of the whole optical signal waveguide with respect to the light beam that reaches from the input optical waveguide to the output optical waveguide, and $\omega$ is the mode field diameter of the input optical waveguide.

In the method of fabricating an optical signal processor according to the present invention, the input optical waveguide and the output optical waveguide are preferably attached after alignment. In such a way, the optical signal processor having a small insertion loss can be obtained.

In the method of fabricating an optical signal processor according to the present invention, the optical signal processor is preferably has a dispersion adjusting function. In addition, the optical signal processor may has an optical multiplexing/demultiplexing function.

Furthermore, in the method of fabricating an optical signal processor according to the present invention, after fabricating the optical signal processor, the one or more optical waveguides selected as the input optical waveguide and the output optical waveguide may be removed. In this case, the one or more optical waveguides each having a set mode field diameter are selected as the input optical waveguide and the output optical waveguide. Thus, the band width of the transmission characteristics of the whole optical signal processor can be set to a desired quantity. And, where the input optical waveguide and the output optical waveguide are removed thereafter, new input and output optical waveguides can be selected to be mounted immediately after the next specification is determined.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, embodiments of a method of fabricating an optical signal processor according to the present invention will be explained in detail with reference to FIGS. 1 to 6. In the explanation of the drawings, constituents identical to each other will be referred to with numerals identical to each other without repeating their overlapping descriptions.

Figure 1:
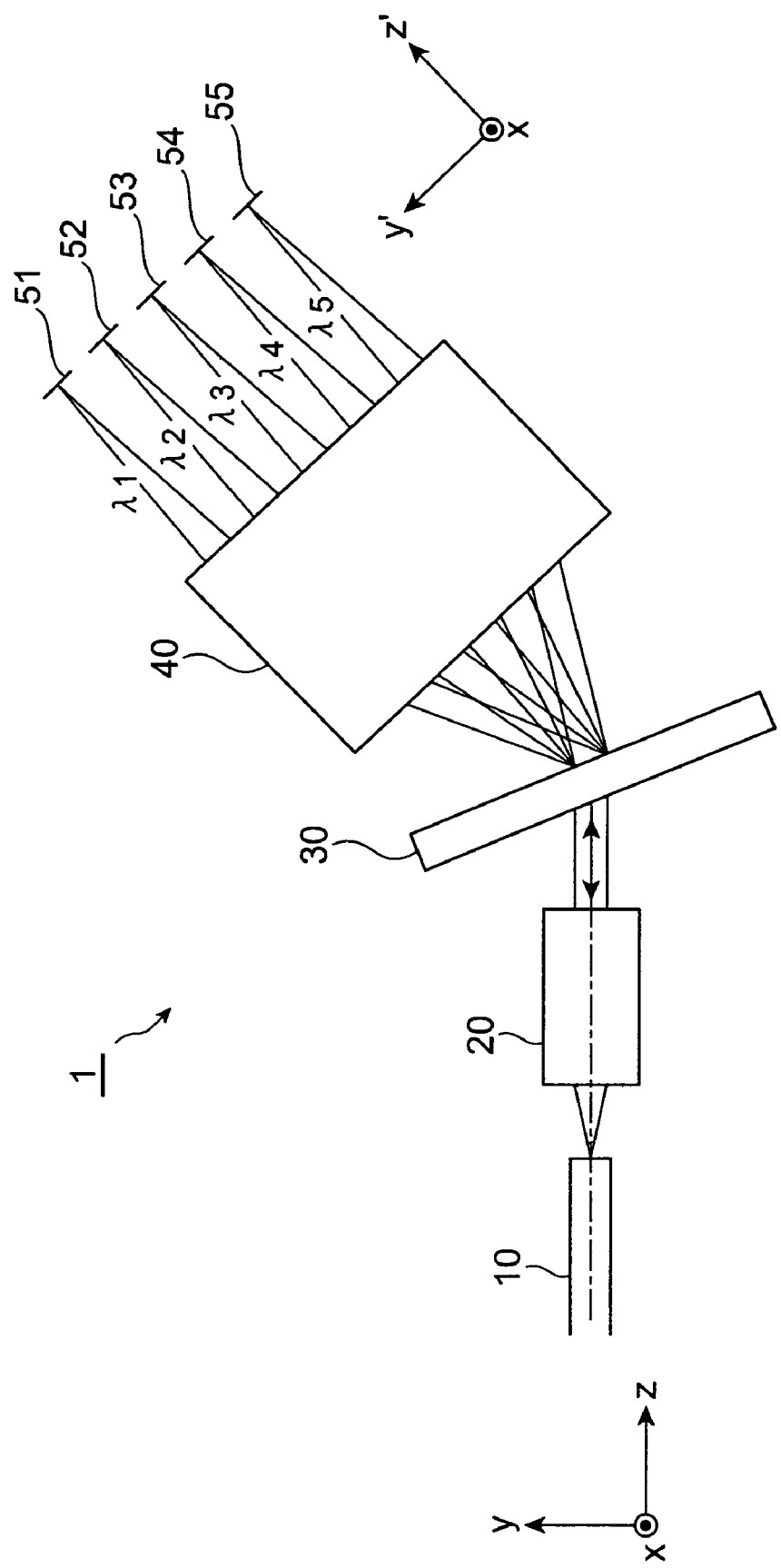
FIG. 1 shows a constructional view of an optical signal processor.

FIG. 1 shows a constructional view of an optical signal processor. The optical signal processor 1 shown in FIG. 1 comprises an optical fiber 10, a first lens optical system 20, a diffraction grating element 30, a second lens optical system 40 and mirror reflectors 51–55. The optical fiber 10 is applied as both input and output optical waveguides. The optical signal processor 1 wavelength-divides and processes the light beam emitted from the end surface of the optical fiber 10, and enters the resultant light on the end surface of the optical fiber 10.

Figure 5:
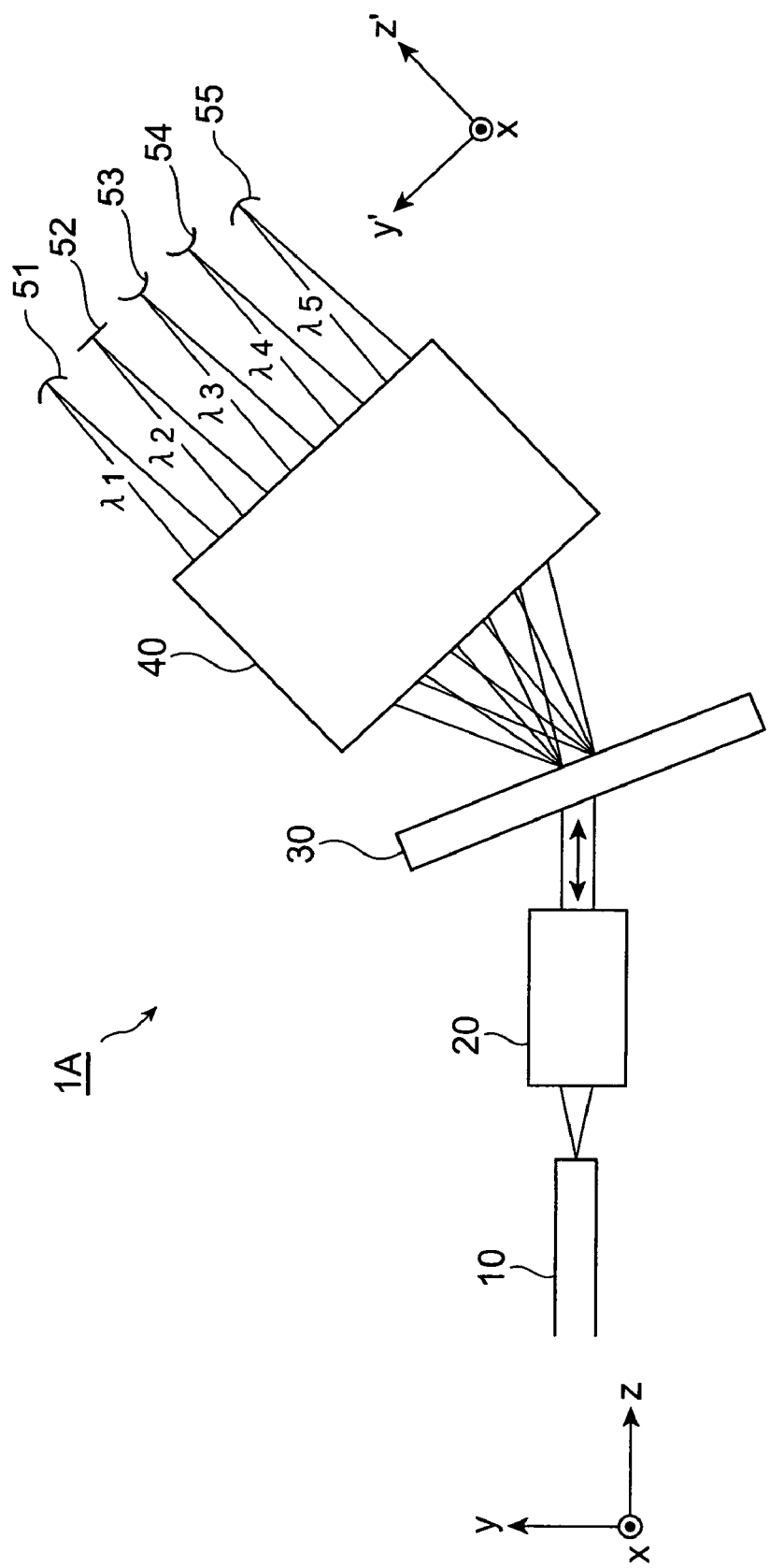
FIG. 5 shows a constructional view of an optical signal processor having a dispersion-adjusting function.
Figure 6:
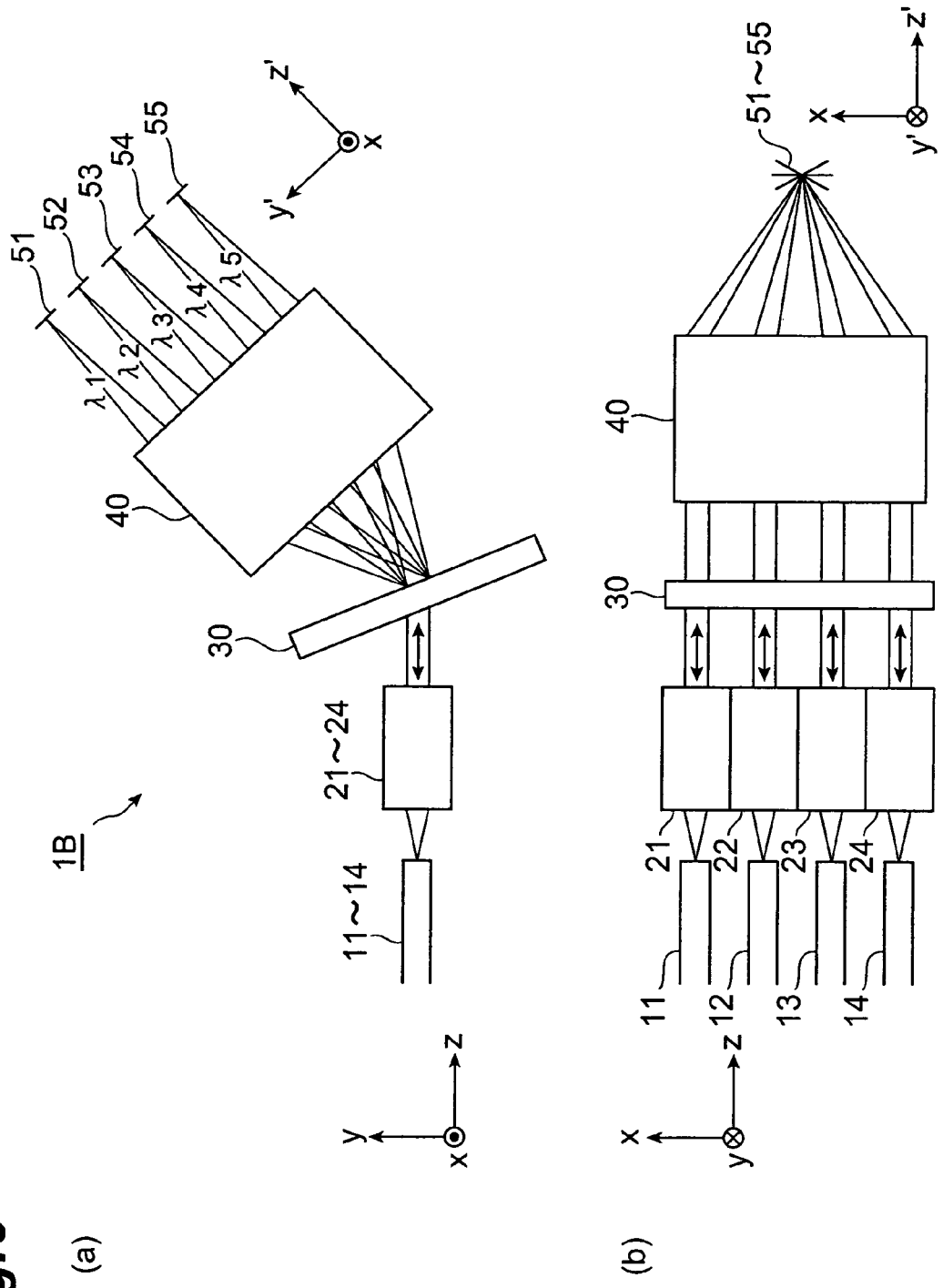
FIG. 6 shows a constructional view of an optical signal processor, having an optical multiplexing/demultiplexing function.

In FIG. 1 (and, FIGS. 5 and 6 shown later), for convenience of explanation, a xyz- and xy'z'-rectangular coordinate systems are represented. The xyz-rectangular coordinate system is applied between the optical fiber 10 and diffraction grating element 30. The xy'z'-rectangular coordinate system is applied between the diffraction grating element 30 and mirror reflectors 51–55. The x-axis of the xyz-rectangular coordinate system and the x-axis of the xy'z'-rectangular coordinate system are in parallel to each other. The optical axis of the lens optical system 20 is in parallel to the z-axis. In addition, the optical axis of the lens optical system 40 is in parallel to the z'-axis.

The lens optical system 20 brings the light beam emitted from the end surface of the optical fiber 10 to a collimated light beam, and outputs the collimated light beam toward the diffraction grating element 30 in parallel to z-axis. The diffraction grating element 30 as a spatial wavelength-dividing element is a transmission-type one, having a diffraction grating of which the grating extending in the x-axis direction and arrayed in a given spacing is formed on one surface of a transparent plate. This diffraction grating element 30 inputs the collimated light beam arrived from the lens optical system 20, wavelength-divides spatially the light beam into a plurality of signal components (beam components) having wavelengths different from each other by diffracting each signal component at a diffraction angle according to the associated wavelength, and outputs the diffracted signal components in parallel to the y'z'-plane. In this embodiment, the diffraction grating element serves to wavelength-divide the light beam into signal components having five wavelengths $\lambda 1$–$\lambda 5$, respectively.

The lens optical system 40 inputs the respective signal components having the five wavelengths $\lambda 1$–$\lambda 5$ diffracted by the diffraction grating element 30 to be outputted. It condenses the signal component having the wavelength $\lambda 1$ on the reflective surface of the mirror reflector 51, condenses the signal component having the wavelength $\lambda 2$ on the reflective surface of the mirror reflector 52, condenses the signal component having the wavelength $\lambda 3$ on the reflective surface of the mirror reflector 53, condenses the signal component having the wavelength $\lambda 4$ on the reflective surface of the mirror reflector 54, and condenses the signal component having the wavelength $\lambda 5$ on the reflective surface of the mirror reflector 55.

The mirror reflectors 51–55 are provided in line in a direction parallel to the y'-axis at the positions of light-condensed points condensed by means of the lens optical system 40. It is preferable that when the mirror reflectors 51–55 are seen from the x-axis direction, these reflective surfaces each are bendable and inclinable. Such mirror reflectors 51–55 can be manufactured by a MEMS (Micro Electro Mechanical Systems) technique.

The mirror reflector 51 reflects the associated signal component having the wavelength $\lambda 1$ outputted from the lens optical system 40 to the lens optical system 40. The mirror reflector 52 reflects the associated signal component having the wavelength $\lambda 2$ outputted from the lens optical system 40 to the lens optical system 40. The mirror reflector 53 reflects the associated signal component having the wavelength $\lambda 3$ outputted from the lens optical system 40 to the lens optical system 40. The mirror reflector 54 reflects the associated signal component having the wavelength $\lambda 4$ outputted from the lens optical system 40 to the lens optical system 40. The mirror reflector 55 reflects the associated signal component having the wavelength $\lambda 5$ outputted from the lens optical system 40 to the lens optical system 40. These reflected signal components having the above wavelengths also travel in parallel to the y'z'-plane.

Then, the lens optical system 40 collimates the signal components having the five wavelengths $\lambda 1$–$\lambda 5$ reflected by the mirror reflectors 51–55, respectively. The collimated signal components are introduced to the diffraction grating element 30. The diffraction grating element 30 multiplexes the collimated signal components having the five wavelengths $\lambda 1$–$\lambda 5$ from the lens optical system 40, and then outputs the multiplexed light beam including the signal components to the lens optical system 20. The lens optical system 20 condenses the multiplexed light beam from the diffraction grating element 30 on the end surface of an optical fiber 10.

The optical signal processor 1 shown in FIG. 1 operates as follows. When the multiplexed light beam including the signal components with the five wavelengths $\lambda 1$–$\lambda 5$ is emitted from the end surface of the optical fiber 10, the emitted dispersion light beam is collimated by the lens optical system 20, and the collimated light beam is inputted to the diffraction grating element 30. The light beam inputted from the lens optical system 20 to the diffraction grating element 30 is diffracted into the signal components with the five wavelengths $\lambda 1$–$\lambda 5$ by an angle of diffraction according to the associated wavelengths.

The signal component having the wavelength $\lambda 1$ diffracted by the diffraction grating element 30 is condensed on the reflective surface of the mirror reflector 51 by the lens optical system 40, reflected by this mirror reflector 51, returned to a collimated light again by the lens optical system 40, and inputted to the diffraction grating element 30. The signal component having the wavelength $\lambda 2$ diffracted by the diffraction grating element 30 is condensed on the reflective surface of the mirror reflector 52 by the lens optical system 40, reflected by this mirror reflector 52, returned to a collimated light again by the lens optical system 40, and inputted to the diffraction grating element 30. The signal component having the wavelength $\lambda 3$ diffracted by the diffraction grating element 30 is condensed on the reflective surface of the mirror reflector 53 by the lens optical system 40, reflected by this mirror reflector 53, returned to a collimated light again by the lens optical system 40, and inputted to the diffraction grating element 30. The signal component having the wavelength $\lambda 4$ diffracted by the diffraction grating element 30 is condensed on the reflective surface of the mirror reflector 54 by the lens optical system 40, reflected by this mirror reflector 54, returned to a collimated light again by the lens optical system 40, and inputted to the diffraction grating element 30. The signal component having the wavelength $\lambda 5$ diffracted by the diffraction grating element 30 is condensed on the reflective surface of the mirror reflector 55 by the lens optical system 40, reflected by this mirror reflector 55, returned to a collimated light again by the lens optical system 40, and inputted to the diffraction grating element 30.

The signal components having the five wavelengths $\lambda 1$–$\lambda 5$ inputted from the lens optical system 40 to the diffraction grating element 30 are diffracted at the angles of diffraction according to the associated wavelengths, to thus be multiplexed. Then, the light beam multiplexed by the diffraction grating element 30 is condensed by the lens optical system 20 and inputted to the end surface of the optical fiber 10.

In the aforementioned optical signal processor 1, a spatial optical modulator for spatially modulating signal components having wavelengths different from each other is provided on the optical path that incident light is wavelength-divided by the lens optical system 40, reflected by the mirror reflectors 51–55, and multiplexed by the lens optical system 40 again, whereby each of the signal components can be processed. In this case, the lens optical system 40 or mirror reflectors 50–55 can be employed as the spatial optical modulator, or another optical element other than these means can be inserted thereinto.

Specific examples for the above structural elements are as follows. A focal length f1 of the lens optical system 20 is 60 mm, while a focal length f2 of the lens optical system 40 is 100 mm. A difference between the angles of diffraction is approximately 0.09 deg/nm in the vicinity of a wavelength of 1550 nm in the optical grating element 30. On a line that links the condensing points on the respective reflective surfaces of the mirror reflectors 51–55, a spacing between the condensing positions of the signal components having two wavelengths in which a difference between the wavelengths is 1 nm is approximately 0.157 mm (=f2·tan(0.09 deg)). Assuming that each optical frequency spacing of the wavelengths $\lambda 1$–$\lambda 5$ is 100 GHz (wavelength spacing is 0.8 nm), a distance between the centers of the mirror reflectors 51–55 is 0.126 nm, and a width $\Delta L$ in the y'-axis direction of the respective reflective surfaces of the mirror reflectors 51–55 is 0.120 mm.

In the optical signal processor fabricating method according to the present invention, the optical signal processor 1 as described above will be fabricated as follows. Namely, the optical fiber 10 is selected, having a mode field diameter such that the band width of the transmission characteristics of the whole optical signal processor 1 (the transmission characteristics where a light beam is emitted from the optical fiber 10, reflected by any one of the mirror reflectors 51–55, and inputted to the optical fiber 10 again) can be set to a desired quantity. The optical signal processor 1 is fabricated by use of the selected optical fiber 10.

In such a way, when the optical fiber 10 having a desired mode field diameter is selected, and the optical signal processor 1 is fabricated by use of the selected one, the band width of the transmission characteristics of the whole optical signal processor 1 can be set to a desired quantity. In addition, design modifications of the optical system reaching from the lens optical system 20 to the mirror reflectors 51–55 can be eliminated, and thereby the band width of the transmission characteristics of the whole optical signal processor 1 can be easily modified in the setting. This fabricating method will be further explained in detail below.

Figure 2:
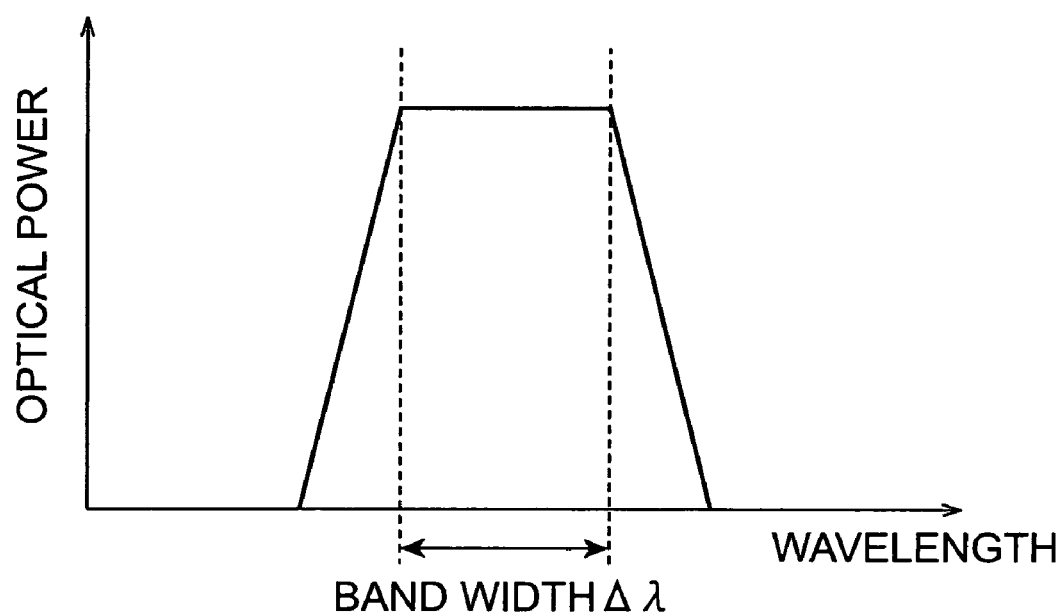
FIG. 2 is a graph showing the transmission characteristics with a light beam that is emitted from an optical fiber (as an input optical waveguide), reflected by any one of mirror reflectors, and again inputted to the optical fiber (as an output optical waveguide) in the optical signal processor shown in FIG. 1.

FIG. 2 is a graph showing the transmission characteristics of a light beam that is emitted from the optical fiber 10, reflected by any one of the mirror reflectors 51–55, and inputted to the optical fiber 10 again in the optical signal processor 1. The transmission characteristics as shown in FIG. 2 is determined by the following way. That is, by using the mirror reflectors 51–55 manufactured by an MEMS technique, the reflective surface of a mirror reflector A that is any one of these mirror reflectors is set to be perpendicular to the Z'-axis direction, while the ones of the remaining four mirror reflectors are removed; thus, when it is brought that a white light beam is emitted from the optical fiber 10 and that only the light beam reflected by the mirror reflector A is returned to the optical fiber 10, the transmission characteristics can be determined.

In FIG. 2, the band width in which the transmission characteristics are substantially flat is represented by $\Delta \lambda$. When the mode field diameter of the optical fiber 10 is 0.015 mm, the band width $\Delta \lambda$ of the transmission characteristics is approximately 0.6 nm. In addition, When the mode field diameter of the optical fiber 10 is 0.005 mm, the band width $\Delta \lambda$ of the transmission characteristics is approximately 0.7 nm.

Figure 3:
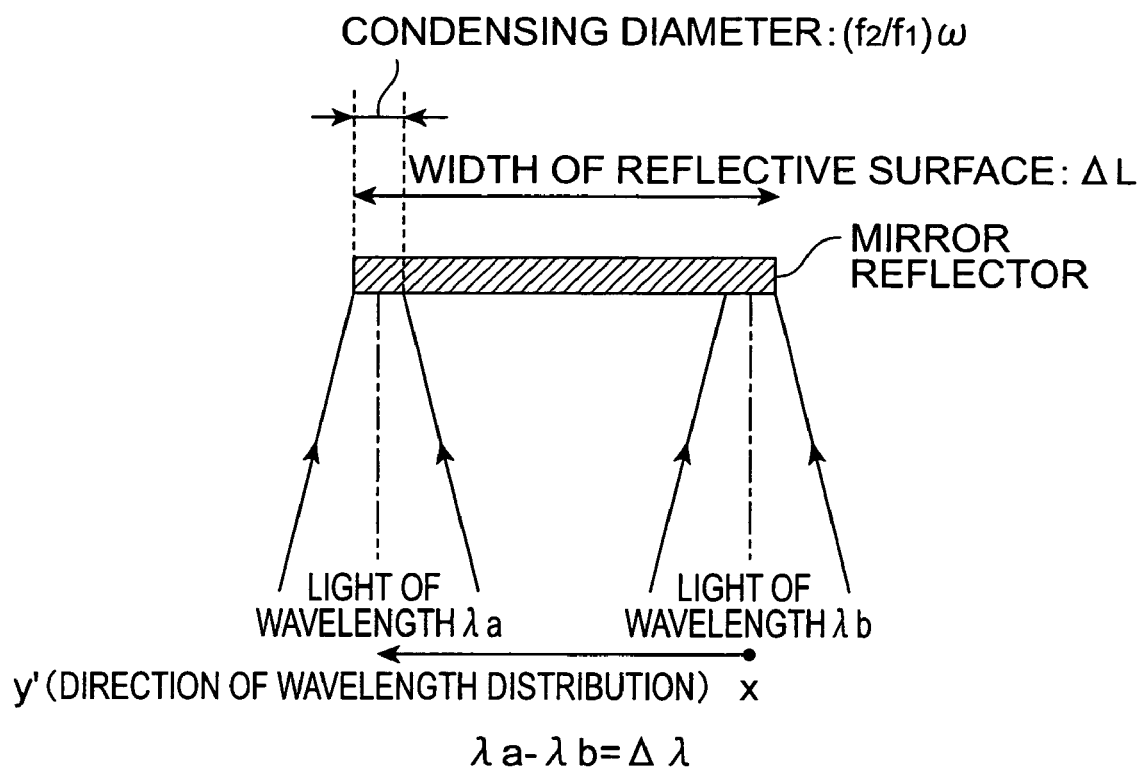
FIG. 3 is an illustration showing an appearance of light incidence to any one of mirror reflectors including the optical signal processor shown in FIG. 1.

FIG. 3 is a view showing an appearance of light incidence to any one of the mirror reflectors 51–55 contained in the optical signal processor 1. Assuming that a wavelength range of light beam is set from $\lambda a$ to $\lambda b$ so that all the energy can reach on the reflective surface of the one mirror reflector, the band width $\Delta \lambda$ of the transmission characteristics is represented by the following formula (1).

$$\Delta\lambda = \lambda a - \lambda b \qquad (1)$$

When $\omega$ is the mode field diameter of the optical fiber 10, a condensing diameter on the reflective surface of the mirror reflector is represented by (f2/f1) $\omega$ from a typical theory in geometrical optics. Meanwhile, $\Delta L$ is the width of the reflective surface of the mirror reflector along the y'-axis direction, and $\lambda \omega$ is the wavelength range of the light such that the principal ray reaches to the reflective surface of the one mirror reflector. In a narrow wavelength range, the relationship between wavelengths and condensed positions at the reflective surface of the mirror reflector is substantially linear. Therefore, there is the relationship between the above parameters which is represented by the following formula (2).

$$(f2/f1)\omega/\Delta L = (\lambda\omega - \Delta\lambda)/\lambda\omega \qquad (2)$$

Here, there are some cases that the band width $\Delta\lambda$ is smaller than a value calculated by the above formula (2) depending on the cross-section of the light beam and the actual optical system, where the transmission characteristics according to the reflection in the one mirror reflector is flat. Accordingly, in the case where the mode field diameter $\omega$ of the employed optical fiber 10 is determined, preferably, a value of $\omega$ is first determined based on the above formula (2); the transmission characteristics are calculated by use of the value of $\omega$ and parameters of the actual optical systems with reference to beam propagation analysis and the like; the value of $\omega$ is adjusted so that the calculated transmission characteristics result in desired ones. Therefore, the optical fiber 10 satisfying the following formula (3) is generally selected, and the optical signal processor 1 can be fabricated by use of the selected optical fiber 10.

$$(f2/f1)\omega/\Delta L \leq (\lambda\omega - \Delta\lambda)/\lambda\omega \qquad (3)$$

In addition, where there is a difference between the mode field diameters of optical fibers, there is generally a difference between the numerical apertures with respect to the light beams emitted from the end surfaces of the optical fibers. Therefore, it is preferable that the lens optical system 20 receives the light beam emitted from the end surface of the optical fiber 10 even when the optical fiber 10 having a large numerical aperture is employed in the optical signal processor 1 shown in FIG. 1. In such a way, the optical signal processor 1 having a reduced insertion loss can be obtained by use of the first lens system 20 capable of receiving the light beam emitted from the end surface of the optical fiber 10 in conformity with the numerical aperture of the optical fiber 10.

In general, since the numerical aperture of a standard single mode optical fiber employed as an optical transmission line is approximately 0.12, it is preferable that the lens optical system 20 is employed, which is capable of receiving the light beam emitted from the end surface of the optical fiber 10 having a numerical aperture of 0.12 or more. In addition, since an optical fiber having a numerical aperture of approximately 0.3 can be easily fabricated, it is further preferable that the lens optical system 20 is employed, which is capable of receiving the light beam emitted from the end surface of the optical fiber 10 having a numerical aperture of 0.3 or more. Furthermore, in order to satisfy a severer characteristics requirement, it is preferable that the lens optical system 20 is employed, which is capable of receiving the light beam emitted from the end surface of the optical fiber 10 having a numerical aperture of 0.4 or more.

In addition, it is preferable that the optical fiber 10 is set such that the splicing loss with an optical fiber serving as a transmission line is not increased. Alternatively, after the optical signal processor is fabricated in such a way, the optical fiber 10 may be newly replaced with another optical fiber or optical waveguide selected in conformity with the optical fiber serving as the transmission line.

Figure 4:
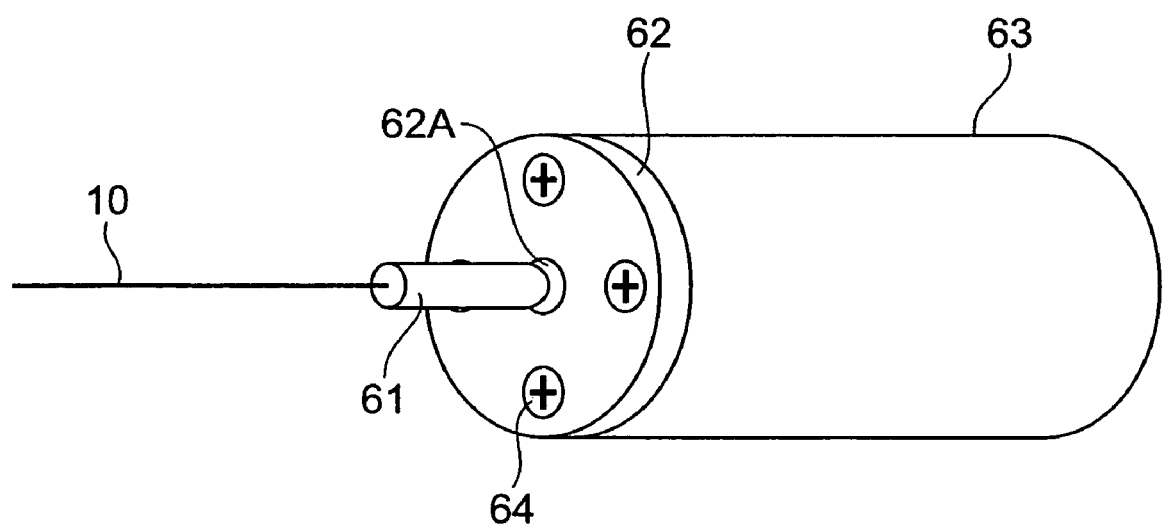
FIG. 4 shows a view for explaining an attaching mechanism of the optical fiber in the optical signal processor shown in FIG. 1.

FIG. 4 shows a view for explaining an attaching mechanism of the optical fiber 10 in the optical signal processor 2. As shown in FIG. 4, a set length including the tip of the optical fiber 10 is inserted into a ferrule 61 having a hollow structure, and the tip of the optical fiber 10 reaches the end portion of the ferrule 61. The end of the ferrule 61 is formed in a semi-spherical shape.

A circular ring-shaped material 62 has a circular opening 62A at the center thereof. The opening 62A has an inner diameter slightly smaller than an outer diameter of the ferrule 61. A cylindrical member 63 has a hollow structure, and the lens optical system 20 is housed and fixed thereinside. The circular ring-shaped material 62 is secured at one end portion of the cylindrical member 63 by means of a screw 64.

While the semi-spherical portion of the end of the ferrule 61 is pressed at the opening 62A of the circular ring-shaped member 62, and the transmissivity of the light beam emitted from the optical fiber 10 and returning to the optical fiber 10 again is monitored, the ferrule 61 is aligned. With this alignment, the ferrule 61 is displaced in parallel to the respective directions of the three axes, and the orientation of the ferrule 61 is adjusted. Then, when the optimum position of the ferrule 61 is obtained, the ferrule 61 and the circular ring-shaped member 62 are secured by adhesive or welding.

In this example, since the cylindrical member 63 and the circular ring-shaped member 62 are screwed, the both are removable. Accordingly, even when the ferrule 61 inserted by the optical fiber 10 is secured at the circular ring-shaped member 62, when these are removed from the cylindrical member 63, a new optical fiber, ferrule, and circular ring-shaped member can be mounted to the optical signal processor.

As described above, even when a requirement specification for the optical signal processor is changed, only the optical fiber 10 can be replaced as the lens optical system 20, diffraction grating element 30, lens optical system 40 and mirror reflectors 51–55 are used in the conventional state. Thus, it is possible to cope with a new requirement specification easily.

FIG. 5 shows a constructional view of an optical signal processor 1A having a dispersion adjusting function. As compared with the construction of the optical signal processor 1 shown in FIG. 1, there is a difference in the optical signal processor 1A shown in FIG. 5 in that the respective reflective surfaces of the mirror reflectors 51–55 are bendable. That is, the mirror reflectors 51–55 each have a bendable reflective surface separately as seen from the x-axis direction. When the curvature of the reflective surface of each mirror reflector is adjusted, the wavelength dispersion of the light beam can be adjusted, and further the adjustment amount can be set to be variable when it is reflected by each of the mirror reflectors.

FIG. 6 shows a constructional view of an optical signal processor 1B having an optical multiplexing/demultiplexing function. Here, (a) shown in FIG. 6 is a view that the optical signal processor 1B is seen in the x-axis direction, and (b) shown in FIG. 6 is a view that the optical signal processor 1B is seen in the y-axis (y'-axis) direction. As compared with the construction of the optical signal processor 1 shown in FIG. 1, the optical signal processor 1B shown in (a) and (b) of FIG. 6 has the following different points. Namely, four optical fibers 11–14 are provided in place of the optical fiber 10, four lens optical systems 21–24 are provided in place of the optical lens system 20, and the respective reflective surfaces of the mirror reflectors 51–55 are inclinable.

The optical fibers 11–14 are arranged on one plane in parallel to the xz-plane, and these optical axes are in parallel to each other. Also, the lens optical systems 21–24 are arranged on one plane in parallel to the xz-plane, and these optical axes are in parallel to each other.

The lens optical system 21 can collimate the light beam emitted from the end surface of the optical fiber 11, and condense the light beam reached from the diffraction grating element 30 to the end surface of the optical fiber 11. The lens optical system 22 can collimate the light beam emitted from the end surface of the optical fiber 12, and condense the light beam reached from the diffraction grating element 30 to the end surface of the optical fiber 12. The lens optical system 23 can collimate the light beam emitted from the end surface of the optical fiber 13, and condense the light reached from the diffraction grating element 30 to the end surface of the optical fiber 13. In addition, the lens optical system 24 can collimate the light emitted from the end surface of the optical fiber 14, and condense the light beam reached from the diffraction grating element 30 to the end surface of the optical fiber 14.

The mirror reflectors 51–55 each have an inclinable reflective surface separately as seen in the y'-direction. When the inclination of the reflective surface of each mirror reflector is adjusted, input optical fibers or output optical fibers can be selected from the optical fibers 11–14 with respect to signal components having wavelengths different from each other, and the input/output port can have a variable optical multiplexing/demultiplexing function.

The present invention can be performed by a variety of modifications, not limited to the above embodiments. For example, though the diffraction grating element 30 is a transmission-type one in the above embodiments, a reflection-type diffraction grating element can be employed instead.

In accordance with the method of fabricating an optical signal processor, even when a width of the transmission range of each signal component varies, it is possible to eliminate design change of lens optical systems and so on, thereby changing easily settings of the range width of the transmission characteristics.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of fabricating an optical signal processor, said optical signal processor including:

a spatial wavelength-dividing element, provided on an optical path reaching from an input optical waveguide to an output optical waveguide, for wavelength-dividing spatially a light beam into a plurality of beam components having wavelengths different from each other;

a spatial optical modulator for modulating spatially the beam components wavelength-divided by said spatial optical modulator;

a first lens system for introducing the light beam outputted from an end surface of said input waveguide to said spatial wavelength-dividing element as a collimated light; and a second lens system introducing the beam components wavelength-divided by said spatial wavelength-dividing element to on said spatial optical modulator while condensing the beam components, said method comprising the steps of:

selecting one or more optical waveguides each having a mode field diameter such that a desired band width of the transmission characteristics of said whole optical signal processor with respect to the light beam reaching from said input waveguide to said output waveguide can be obtained, and fabricating said optical signal processor by applying said selected optical waveguide as a common optical waveguide corresponding to both of said input optical waveguide and said output optical waveguide, or by applying one of said selected optical waveguides to said input optical waveguide and applying another of said selected optical waveguides to said output optical waveguide.

2. A method of fabricating an optical signal processor according to claim 1, wherein said spatial wavelength-dividing element includes a diffraction grating element.

3. A method of fabricating an optical signal processor according to claim 1, wherein said spatial optical modulator includes a mirror reflector.

4. A method of fabricating an optical signal processor according to claim 3, wherein said mirror reflector has an inclinable or bendable reflective surface.

5. A method of fabricating an optical signal processor according to claim 1, wherein said first lens optical system receives the light beam emitted from the end surface of said input optical waveguide with a numerical aperture of 0.12 or more.

6. A method of fabricating an optical signal processor according to claim 1, wherein said first lens optical system receives the light emitted from the end surface of said input optical waveguide with a numerical aperture of 0.3 or more.

7. A method of fabricating an optical signal processor according to claim 1, wherein said first lens optical system receives the light beam emitted from the end surface of said input optical waveguide with a numerical aperture of 0.4 or more.

8. A method of fabricating an optical signal processor according to claim 1, wherein said one or more optical waveguides selected as said input waveguide and said output waveguide satisfy the following relationship:

$$(f2/f1)\omega/\Delta L \leq (\lambda\omega - \Delta\lambda)/\lambda\omega$$

where f1 is the focal length of said first lens system, f2 is the focal length of said second lens system, $\lambda\omega$ is the wavelength range of the light beam whose principle beam reaches from said spatial wavelength-dividing element to a reflective surface of one mirror reflector that as said spatial optical modulator, $\Delta L$ is a width of the reflective surface along a wavelength-dividing direction according to said spatial wavelength-dividing element, $\Delta\lambda$ is the band width of the transmission characteristics of said whole optical signal processor with respect to the light beam reaching from said input optical waveguide to said output optical waveguide, and $\omega$ is the mode field diameter of said input optical waveguide.

9. A method of fabricating an optical signal processor according to claim 1, wherein said input optical waveguide and said output optical waveguide are attached after alignment.

10. A method of fabricating an optical signal processor according to claim 1, wherein said optical signal processor has a dispersion adjusting function.

11. A method of fabricating an optical signal processor according to claim 1, wherein said optical signal processor has an optical multiplexing/demultiplexing function.

12. A method of fabricating an optical signal processor according to claim 1, wherein, after fabricating said optical signal processor, said one or more optical waveguides selected as said input optical waveguide and said output optical waveguide are removed in order to determine a next specification.

* * * * *